United States Patent [19]

Hosaka

[11] Patent Number: 4,707,615
[45] Date of Patent: Nov. 17, 1987

[54] SOLID STATE IMAGE SENSOR
[75] Inventor: Yasuo Hosaka, Tokyo, Japan
[73] Assignee: Tokyo Shibaura Denki Kabushiki Kaisha, Japan
[21] Appl. No.: 838,202
[22] Filed: Mar. 7, 1986

Related U.S. Application Data

[63] Continuation of Ser. No. 483,255, Apr. 8, 1983, abandoned.

[30] Foreign Application Priority Data

Apr. 13, 1982 [JP] Japan .................................. 57-60366

[51] Int. Cl.⁴ ............................................. H01J 3/14
[52] U.S. Cl. .................................... 250/578; 358/212; 358/213.13; 358/213.26; 250/226
[58] Field of Search ................... 250/578, 211 T, 226; 357/24 LR, 31, 32; 358/212, 213

[56] References Cited

U.S. PATENT DOCUMENTS

| | | | |
|---|---|---|---|
| 4,005,285 | 1/1977 | Price | 250/208 |
| 4,009,388 | 2/1977 | Seachman | 250/211 J |
| 4,200,788 | 4/1980 | Aguenek | 250/578 |
| 4,249,217 | 2/1981 | Korte | 250/578 |
| 4,271,435 | 6/1981 | Takenouchi | 250/208 |
| 4,467,195 | 8/1984 | Kawamura | 250/578 |

FOREIGN PATENT DOCUMENTS

| | | |
|---|---|---|
| 50-97439 | 8/1975 | Japan . |
| 55-36909 | 3/1980 | Japan . |
| 5132254 | 10/1980 | Japan . |
| 56-30156 | 3/1981 | Japan . |
| 6123079 | 9/1981 | Japan . |

OTHER PUBLICATIONS

K. Komiya, M. Kanzaki, and T. Yamashita, "A 2048—Element Contact Type Linear Image Sensor for Facsimise,"IEEE, IEDM 81-309 (1981).
H. Sekine, N. Suzuki, and K. Matsushima, "CCD Linear Image Sensor," *Toshiba Review* No. 127, p. 34 (May-June 1980).
Homiya, et al., "A₄ Size Contact Type Image Sensor," Gazou Denshi Gakkai Yokou, Mar. 10, 1980, pp. 73-82.
K. Tsubota, *Facsimile and Still Picture Image,* pp. 100-103 (published by Corona Co. Mar. 20, 1975).
Y. Kanoh, et al., "A Contact-Type Linear Sensor with an A GD A-Si:H Photodetector Array," International Electron Devices Meeting, Washington, D.C., Dec. 7-9, 1981, pp. 313-316.
K. Tateishi, et al., "Optical Print Head with LED Array as a Light Source," Denishi Tsuushin Gakkai Gijutsu Kenkyu Houkoku, Apr. 14, 1981, pp. 25-31.

*Primary Examiner*—Edward P. Westin
*Assistant Examiner*—Charles F. Wieland
*Attorney, Agent, or Firm*—Banner, Birch, McKie & Beckett

[57] ABSTRACT

A high-resolution image sensor uses integrated arrays of photosensitive elements in connection with a lens system which projects, onto the arrays, an erect, unmagnified, unreversed real image of the object being sensed (such as a line of a document). The arrays are staggered in two or more rows so that a single, large integrated array need not be used, yet the entire width of the document line can be covered by photosensitive elements while a 1:1 ratio is maintained between object size and image size. The real image is produced on the two or more rows of arrays by two or more optical systems which have a large depth-of-focus to allow for some variation in object distance. The sensor has a high image quality and is capable of detecting color.

26 Claims, 21 Drawing Figures

SOLID STATE IMAGE SENSOR

This application is a continuation of application Ser. No. 483,255, filed Apr. 8, 1985 now abandoned.

BACKGROUND OF THE INVENTION

This invention relates to a solid state image sensor, and more particularly, to a high-speed solid state image sensor which is used for image read out devices.

Information processing systems, for example computers, have advanced rapidly, and their processing abilities are superior to those of humans in a limited area. However, devices which input data to information processing systems have not advanced commensurately. Efforts have been made to develop more advanced image readers in the field of facsimile, because of the industry's urgent need for practical devices. One of the technical objects has been to achieve high resolution image sensing as well as to reduce the size of the device. Another object has been to read out color images.

Furthermore, in the field of copiers attempts have been made to form the picture elements with dot type or heat-sensitive transfer systems instead of the conventional electrophotographic process. In this case, higher speed and resolution have been required of the input device than are needed with an ordinary facsimile apparatus.

Solid state scanning systems exist which are capable of satisfying the above requirements. For example, there is one which comprises photodiode arrays acting as photoelectric converters, and MOS switches for scanning the arrays. Another system combines, in a single type of semiconductive element, the functions of both image resolution and information storage. These solid state image pickup elements are highly integrated so the size of one chip is much smaller than that of a document. Therefore, an optical mechanism is required for reducing the size of the image. For example, as noted in U.S Pat. No. 4,217,435 at col. 1, 1.66 through col. 2, 1.12, currently-available CCD or photodiode arrays are constructed as integrated circuits and are therefore very small in size. In order to read a large document using a single, small CCD array, one must employ an optical system which reduces the image to a size comparable to the integrated array. Such an optical system is necessarily large. On the other hand, using a 1:1 optical system (such as self-focus lenses) is also disadvantageous because the size of the photosensor array which would be required with a 1:1 optical system is extremely large. Moreover, to use separate semiconductor switches (rather than integrated arrays) for the photosensor and associated apparatus would be much too expensive and would produce a device too large for practical purposes.

The problem of covering a large area using a series of small photosensor arrays has been treated in U.S. Pat. No. 4,005,285. There, a beam splitter is used to divide an image into two images for projection onto two rows of photosensor arrays, the arrays being staggered so that they are, in effect, combined into a single line of photosensitive elements. In this device, problems of positioning the photosensor arrays are a serious drawback. First, they must be positioned directly under the image projected by the beam splitter, which is constructed to produce two image lines a fixed distance apart. The beamsplitter cannot be adjusted to move one of the image lines if the distance between the photosensor arrays is incorrect; the arrays themselves must be moved. This is difficult when one considers that the width of a single line of photosensitve elements is in the region of $10^{-5}$m. Second, the photosensitive element arrays must be positioned longitudinally so that the optical effect is one continuous line of photosensors (see FIG. 1B of the '285 patent). In other words, the effective gap between the last element in the array in one row and the first element in the next array in the other row must be the same as the gap between two adjacent photosensitive elements, which is considerably less than $10^{-5}$m. If the gap is too great, information will be lost. If there is no gap, but rather some overlap, blurring or additional undesired characters will be present in the reproduced document. Furthermore, the necessity that the lens system be aligned properly with the beam splitter presents an additional obtacle to accurate image sensing with the device of the '285 patent.

Image sensors have been developed in which the lens system is omitted, and in which the document (which is the object) and the sensor or image directly correspond by a 1:1 ratio. This type of image sensor has no lens system, so the device can be compact. But in this type, the quality of the image data read by the sensor becomes extremely deteriorated, if the distance between the document and sensor is not maintained to close tolerances, for example, 10 um or so. Furthermore, in this type of device, the response characteristic of the sensor material is weak and high speed read-out is not possible.

SUMMARY OF THE INVENTION

Accordingly, an object of the present invention is to provide an inexpensive, high resolution sensor.

Another object is to provide such a sensor in which the image quality is superior to that available in comparable prior art devices.

A further object of the invention is to provide such a sensor which is capable of high speed operation.

Another object of the invention is to provide such a sensor in which the moving parts are compact and light in weight.

Still another object is to provide such a sensor capable of color reproduction.

A further object of the invention is to provide such a sensor in which construction is simplified by allowing more error in the placement of photosensitive arrays on the base and in which errors introduced in this manner are removed electronically.

Further objects and advantages of the invention will be apparent from the following description.

In this invention, the image which is read by the sensor is transmitted to the photosensitive element arrays as an erect, unmagnified and unreversed real image of the object or document. The path of the light reflected from the object is formed into a plurality of paths, and along each of these paths of light is a plurality of photosensitive element arrays. Output registers corresponding to these arrays transport electrical signals generated by the photosensitive element arrays. Preferably, the size of each photosensitive element in the arrays is less than or equal to ½ the size of the picture element which it is desired to resolve in the solid state image sensor.

Using this invention, it is possible to read out wide documents, because a plurality of photosensitive element arrays are used to cover each scanning line. One advantage of using a plurality of arrays rather than one is that, when the data are read serially out of the output registers, the plurality of segments of the line can be read simultaneously. In other words, the time required to read a line of data serially from the output registers is improved by approximately one divided by the number of arrays. High resolution is realized because the image is the same size as the object. Since the photosensitive element array is made of a semiconductor material, this solid state image sensor may be highly integrated.

Moreover, as output registers are provided for each array, transportation of the signal occurs in parallel form between the arrays and the registers, resulting in higher operating speed. At the same time, the transportation distance (number of shifts necessary to output the information) is shortened, and the probability of error reduced.

By using a plurality of lens systems to divide the light from the image into a plurality of paths, instead of a beam splitter, adjustment of the light paths is more easily accomplished. Furthermore, longitudinal placement of the photosensor arrays on the base is not critical because elements are intentionally overlapped. The extra information received by these overlapped elements is stored in the memory of the image sensor and is removed upon retrival of the information from memory.

The invention will now be described in detail with reference to the accompanying drawings.

BRIEF DESCRIPTION OF THE DRAWINGS

FIGS. 18 and 19 (a-c) are diagrams illustrating the way in which redundant information, due to optical overlap of the CCD arrays, is removed.

DESCRIPTION OF THE PREFERRED EMBODIMENT

In the preferred embodiment, a solid state image sensor is provided which can read out a document of A4 size. This solid state image sensor comprises photosensitive elements (CCD cells), output registers (also CCD arrays) which transport the electric charges generated by the photosensitive elements, self-focusing rod-lens-arrays comprising an optical system which projects onto the photosensitive elements an unmagnified, unreversed, erect real image of the document line, and a uniform light source. In this embodiment, both the photosensitive element arrays and the output registers are CCD (charge coupled device) arrays, integrated on the same chip.

A single photosensitive element, for example a photodiode, is made of C-Si. The photosensitive speed of a C-Si photodiode is relatively high, in comparison with the photosensitive speed of a CdS or CdSe photodiode, because of the greater mobility of electrons in C-Si. In the following explanation, photosensitive elements are referred to as CCD cells.

Figure 1:
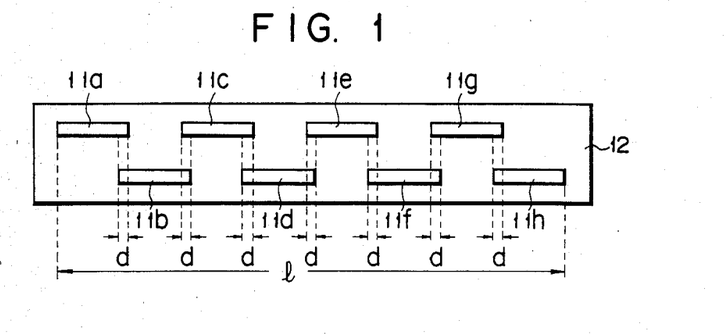
FIG. 1 is a plan view, showing the disposition of linear CCD arrays in the preferred embodiment.

The CCD cells of this embodiment are arranged on a semiconductor chip in a straight line with a pitch of 14 um, 2048 cells to a line. As shown in FIG. 1, 8 semiconductor chips 11a–11h containing CCD arrays are staggered in two rows on a ceramic base. The total length of the CCD arrays on chips 11a–11h must be greater than the width 1 (210 mm) of the A4 size document, in order to provide for optical overlap of the arrays. Chips 11a–11h have overlapping portions, at their ends, each of whose length, d, is approximately 2.38 mm, which corresponds to 170 CCD cells.

Figure 2:
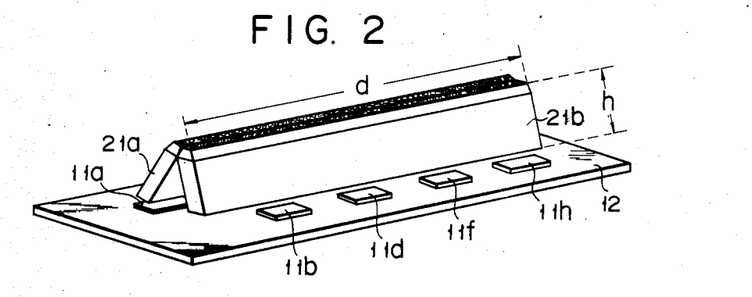
FIG. 2, a schematic perspective view, shows the relationship between the CCD chips and the self-focusing rod-lens-arrays, in the preferred embodiment.

Two self-focusing rod-lens-arrays face chips 11a–11h. These rodlens-arrays may be, for example, Selfoc lenses made by Nippon-Itagarasu Co. Rod-lens arrays 21a, 21b are arranged in the form of a V so that their optical axes cross on the surface of the document 32. The length of each rod-lens-array 21a, 21b is greater than the width of the A4 size document and is equal to the combined length of the chips 11a–11h. The height h of the self-focusing rod-lens-arrays 21a, 21b is usually 20 mm–50 mm in order to achieve the proper depth of focus. (The greater the height h, the greater is the depth of focus.) The self-focusing rod-lens-arrays 21a, 21b are normally shaped like boards. In this embodiment, the edges of the self-focusing rod-lens-arrays 21a, 21b are cut off so that they abut each other along a plane. Then, by adjusting the angle of the slope which is cut off, the angle between two rod-lens-arrays 21a, 21b is adjusted. Furthermore, in this manner the space which is occupied by the rod-lens-arrays is reduced, and no light passes between them.

Figure 3:
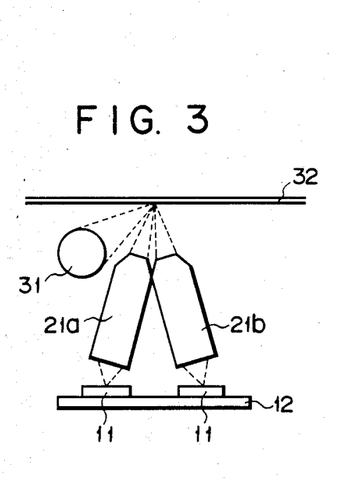
FIG. 3 is a schematic sectional view of the embodiment shown in FIG. 2, with the addition of light sources, for explaining the image made on the CCD chips.

Light source 31 is necessary to this image sensor. As shown in FIG. 3, light source 31 is positioned near, and parallel to, the rod-lens-arrays 21a, 21b. It is shown as a line source of light because the quality of image reproduction is much higher with uniform illumination. Light source 31, self-focusing rod-lens-arrays 21a, 21b and ceramic base 12 are manufactured as a single assembly, the optical head of the solid state image sensor. This optical head, positioned across the document, reads the information contained in the document line by line.

When light from light source 31 illuminates a line of the document, reflected light from the line enters self-focusing rod-lens-arrays 21a, 21b, which form an image of the document line on the CCD photosensor arrays. (Because the depth of focus of self-focusing rodlens-arrays 21a, 21b is very great, they form a sharp image on the CCD arrays even if the distance between self-focusing rod-lens-arrays 21a, 21b and document 32 varies slightly.) Moreover, the image is the same size as the document 32.

Figure 4:
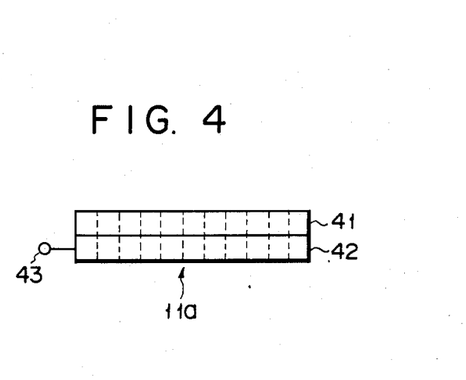
FIG. 4 is a diagram showing details of one of the semiconductor chips containing CCD arrays.

FIG. 4 schematically illustrates a typical chip 11a in detail. Each chip contains two integrated CCD arrays 41 and 42 formed as a unit. One of the arrays, for example 41, acts as the photosensor. The CCD cells (shown as the individual squares) in array 41 convert incident light into electrical signals. The other array, 42, also contains CCD cells (shown as squares) and functions as a transport device for electrical signals. The signals produced in array 41 are transported in parallel to array 42, from which they are serially output through output terminal 43.

Figure 5:
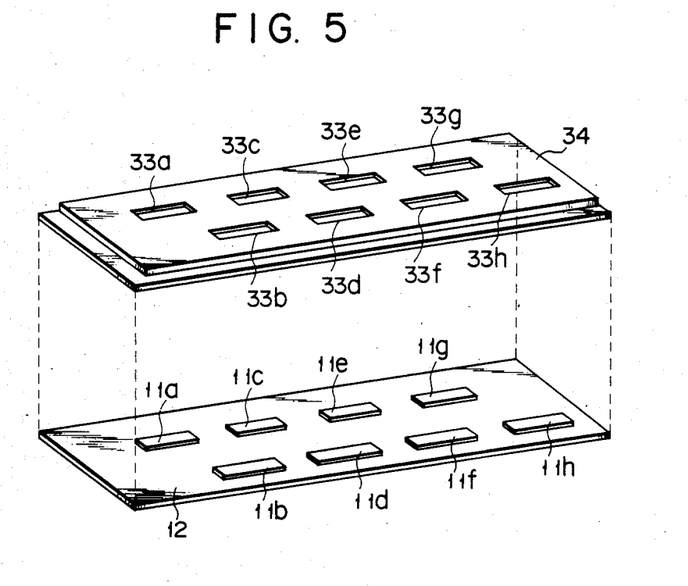
FIG. 5 is a perspective view of a cover removed from the base.
Figure 6:
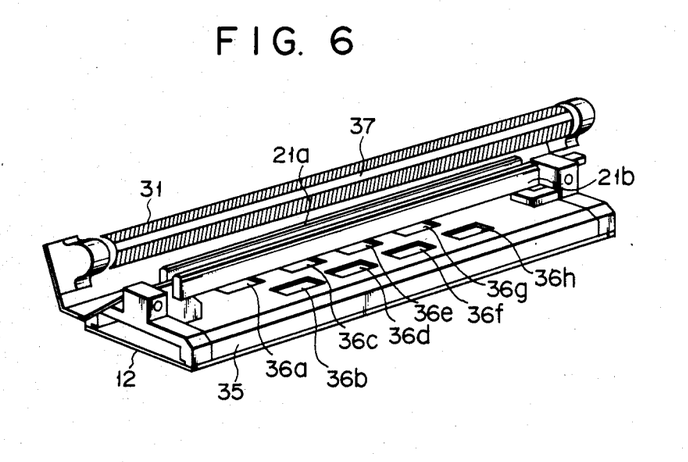
FIG. 6 shows a perspective view of the optical head of the preferred embodiment.
Figure 7:
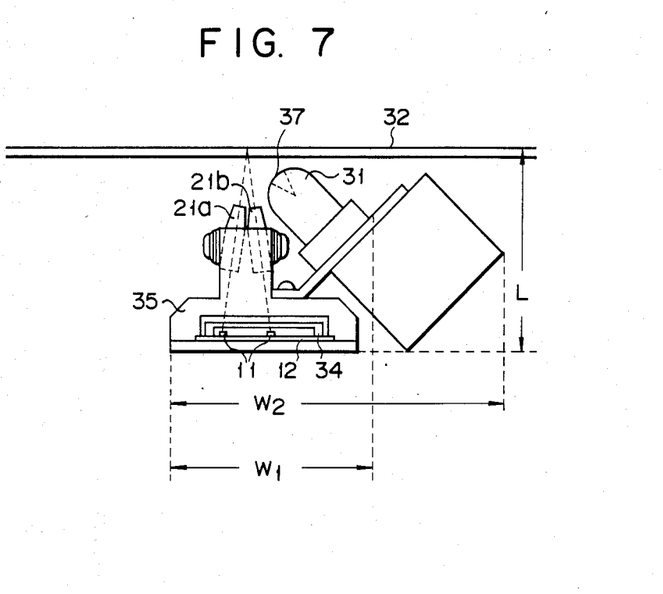
FIG. 7 is an end view of the optical head shown in FIG. 6.
Figure 8:
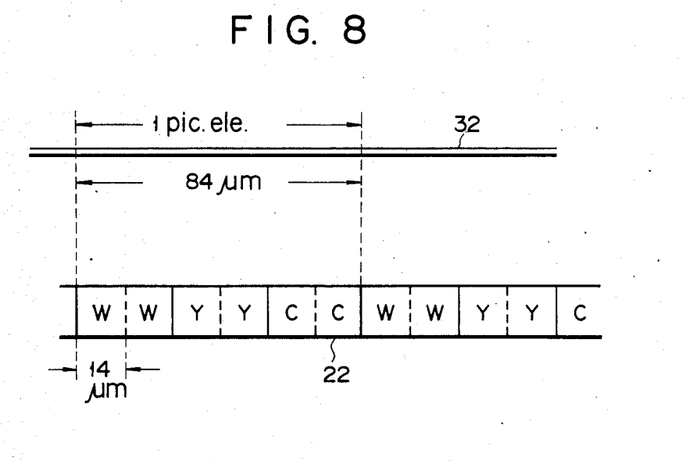
FIG. 8 is a diagrammatic view explaining the way in which filters are positioned on the CCD cells.

As shown in FIG. 5, on the base 12 which supports CCD chips 11a–11h is placed a cover 34 having windows 33a–33h. The cover 34 does not transmit light except through the position of windows 33a–33h, which correspond in position to chips 11a–11h. As shown in FIGS. 6 and 7, the support bracket 35 is attached to both base 12 and cover 34. On the upper wall of support bracket 35 there are openings 36a–36h in a position corresponding to windows 33a–33h. Self-focusing rod-lens-arrays 21a, 21b are mounted on bracket 35 so that rod-lens-arrays 21a, 21b are positioned over openings 36. A light source 31 is also mounted on support bracket 35 so that the light is directed toward the docment at an angle of about 45°. This angle provides an acceptable balance among illumination efficiency, glare, and space considerations. Other angles could be used. Most of the light source is masked, preventing light from being radiated except along a narrow, well-defined line 37. This confines the light to the document line being read, and a small adjacent area of the document.

FIG. 7 illustrates the relationship between the solid state image sensor and document 32. Self-focusing rod-lens-arrays 21a, 21b are positioned so as to face the document 32, and illumination line 37 of light source 31 is positioned so as to face the document at an angle of 45°.

In the embodiment shown in FIG. 7, the distance L from document 32 to base 12 is about 60 mm, distance $W_1$ from the edge of the support bracket 35 to the edge of light source 31 is 60 mm and distance $W_2$, the total width of the optical head from the edge of support bracket 35 to the edge of the lighting circuit 38 for light source 31 is 100 mm.

Next, the arrangement of the CCD cells is explained. In this embodiment, the resolution of the proximity sensor is to be 12 dots/mm at the document, which equates to a picture element size of 84 um. Because the optical system is 1:1, that is, it provides an unmagnified image, the size of picture elements at the CCD arrays will also be 84 um. CCD cells are then arranged at a pitch of 14 um. That is, there are approximately 72 CCD cells per mm; so there are 6 cells allocated to each picture element.

In order to discern colors in the document, two filters each of white W, yellow Y and cyan C are superimposed on the 6 CCD cells representing each picture element. However, on the cells at one end of each array, opaque filters are used. As discussed below, the colored filters are attached in pairs in order to reduce error. As is well known in the art, filters of the three colors magenta, yellow, and cyan (the subtractive primaries) each transmit different wavelengths of light and together transmit almost the entire spectrum. The color of an image may therefore be reproduced with fidelity if the amounts of magenta, yellow, and cyan inthe light reflected from the original are known. It is also possible to use filters of white, yellow, and cyan to reproduce the colors of the original, since the intensity of magenta light is calculable by subtracting from white the values of yellow and cyan.

Figure 9:
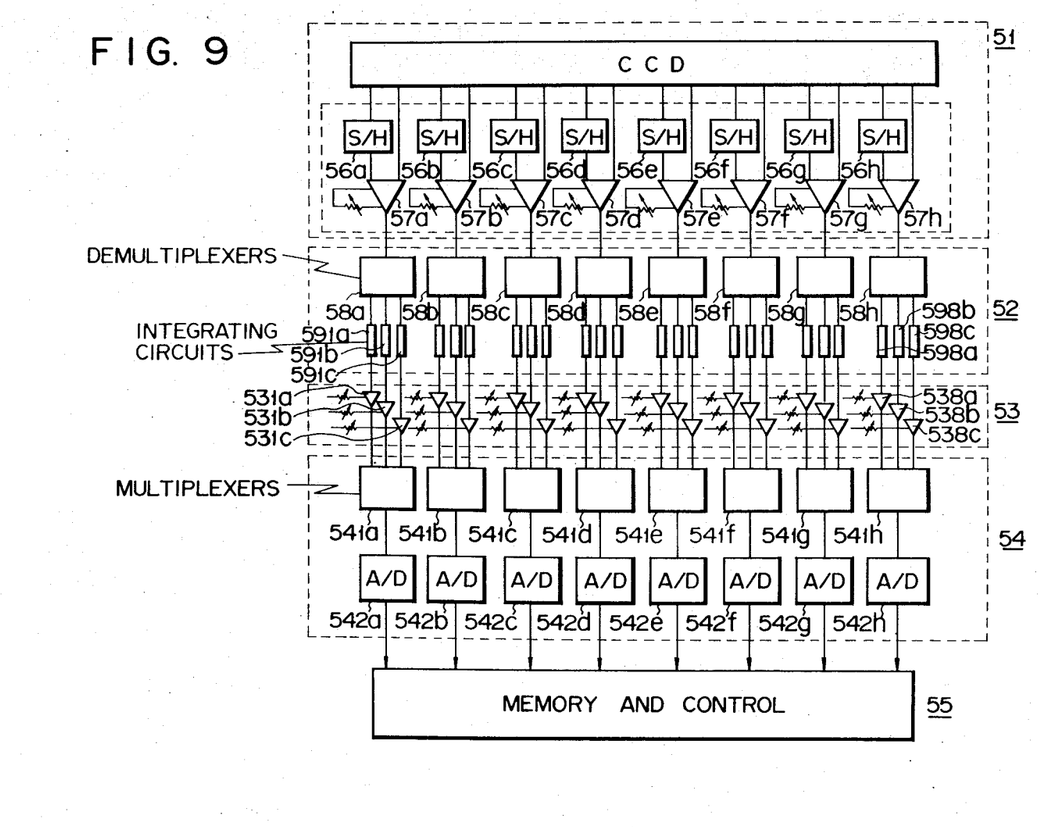
FIG. 9 shows a block diagram of the signal processing circuit of the preferred embodiment.

Next, the circuit used for processing the signals from the CCD arrays is explained. As shown in FIG. 9, this circuit consists of five major sections: input section 51, integrating section 52 (which separately integrates the signal from input part 51 for each color), amplifying section 53, conversion section 54 (which converts the amplified color signals to digital form), and memory 55 (in which is stored the digital information representing the document). Input section 51 consists of chips 11a–11h (including the CCD photosensor arrays and the CCD output registers), sampling and holding circuits 56a–56h which operate as zero-level clamping circuits, and differential amplifiers 57a–57h. The serial output signal from each CCD output register enters a separate sampling and holding circuit 56a–56h and a separate differential amplifier 57a–57h, respectively. The output signal of each sampling and holding circuit 56a–56h also is input to the corresponding differential amplifier 57a–57h. Integrating section 52 consists of demultiplexers 58a–58h which separate the outputs of the differential amplifiers by color, and integrating circuits 591–598 which integrate the color output signals of demultiplexers 58a–58h. Amplifying section 53 consists of amplifiers 531–538 which amplify the integrated color signals from integrating circuits 591–598. Conversion section 54 consists of multiplexers 541a–541h which select, in succession, the 3 color signals from the amplifiers 531–538, and A/D converters 542a–542h which convert the analog output signals from multiplexers 541a–541h to digital form. Memory 55 includes 6 line memories, each pair of line memories corresponding to one of the colors white, yellow and cyan, as well as the control logic necessary to read the signals into and out of the line memories.

Figure 10:
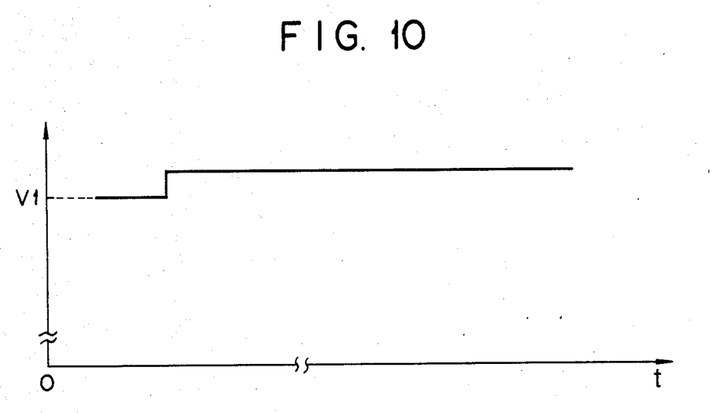
FIGS. 10 to 15 show signals in parts of the circuit shown in FIG. 9.

In the case of reading a white document, the pulse signal from the CCD scanning pulse generator (not shown) is supplied to all eight CCD arrays simultaneously. Synchronized by this scan signal, the image information from the CCD cells is output as shown in FIG. 10. The voltage of the output signal of the first 6 CCD cells (corresponding to the first picture element) is $V_1$, because opaque filters cover the CCD cells for at least the first picture element. Voltage $V_1$ results from the dark current of the CCD arrays and in many cases is 6 to 8 volts. By comparison, the output voltage from the CCD cells covered by white, yellow or cyan filters is variable at about 100 mV above $V_1$. The voltage $V_1$ is hereafter called the reference voltage. The purpose behind the opaque filters is, of course, to establish a reference voltage with which the output from the other CCD cells can be compared. Reference voltage $V_1$ is input to one side of the differential amplifier for a given CCD array, and held there by the sample-and-hold circuits, while the serial output from the rest of the CCD cells in the array (those covered by white, yellow, and cyan filters) is input to the other side of the differential amplifier. The amplifier's output then represents the difference between each cell's voltage and the dark current voltage. Sampling and holding circuits 56 keep feeding the reference signal $V_1$ to differential amplifiers 57 until the output signals of the 2048 CCD cells in each array have been sent to differential amplifiers 57.

Figure 11:
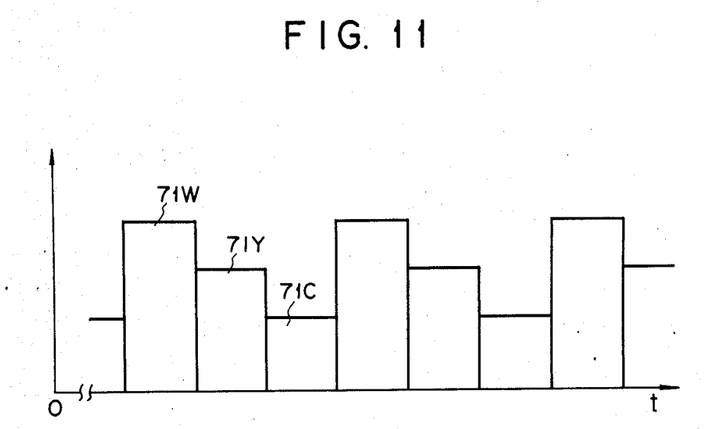

At this time, as shown in FIG. 11, the output signal of a given differential amplifier 57 is a sequence of signals 71W from the white-filtered CCd cells, signals 71Y from the yellow-filtered CCD cells and signals 71C from cyan-filtered CCD cells. Each signal 71W, 71Y or 71C contains the information from two adjacent CCD cells. Consequently, picture elements as small as 28 um (36 dots/mm) may be resolved, if color is not considered.

Figure 12:
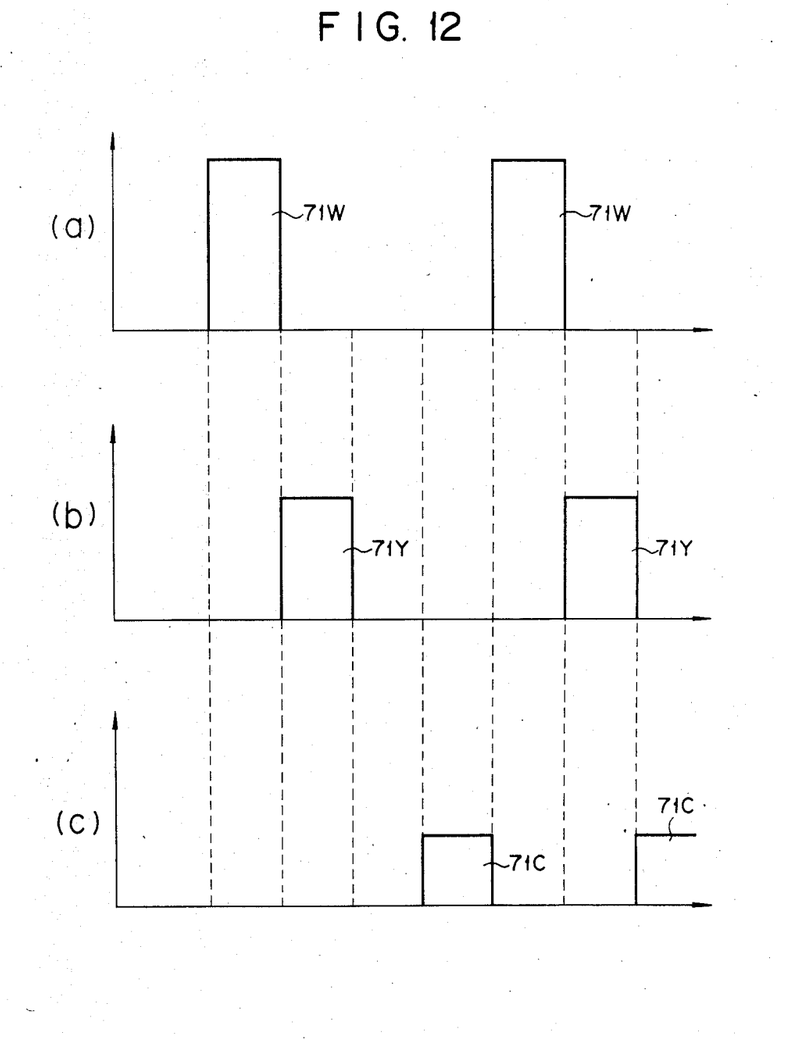

This sequential analog signal is separated into its constituent color signals in demultiplexers 58. For example, signal 71W (shown in FIG. 12a) from the white-filtered CCD cells, after demultiplexing at 58a, is supplied to integrating circuit 591a. Similarly, yellow signal 71Y (shown in FIG. 12b) is supplied to integrating circuit 591b, and cyan signal 71C (shown in FIG. 12c) is supplied to integrating circuit 591c.

Figure 13:
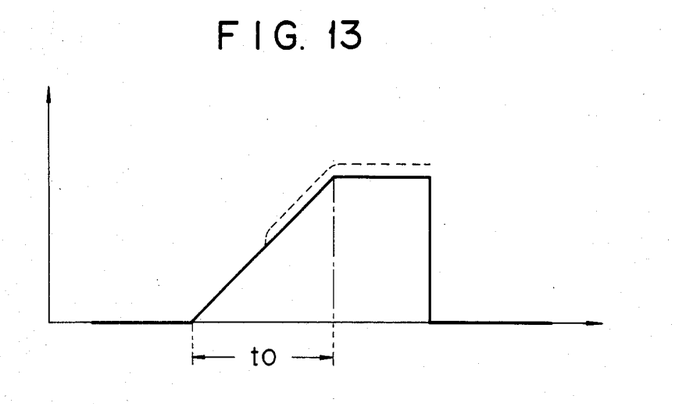

In integrating circuits 591a, 591b and 591c (and their counterparts 592–598) caspacitors (not shown in the figure) are charged. As shown in FIG. 13, the action of integration continues during the time to when the signals are supplied to the integrating circuits. When integration is finished, the constant voltages shown as a solid line in FIG. 13 are supplied to amplifiers 531, 531b and 531c, of FIG. 9 and their counterparts 532–538.

Figure 14:
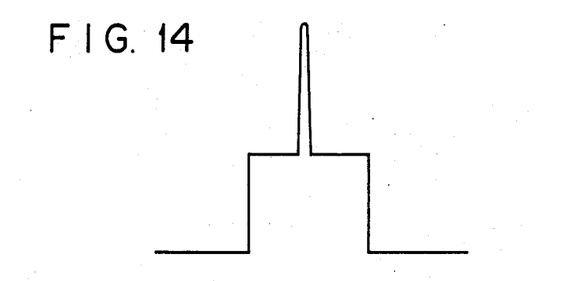

The purpose of the integrating circuits is to eliminate noise. For example, as shown in FIG. 14, assume that a noise spike is added to the signal before its arrival at the integrating circuit. When this signal is intergrated as shown in the broken line in FIG. 13, although the integrated value is changed somewhat, the effect of the noise is negligible. Thus, in effect, a signal free of noise is supplied to the amplifiers. The amplification factor of all of the amplifiers is adjusted so that their output voltages, for signals of one color, are uniform. For example, the output voltages of amplifiers 531, 531b and 531c will be adjusted to $V_2$ in the case where the colors of all picture elements are white.

Figure 15:
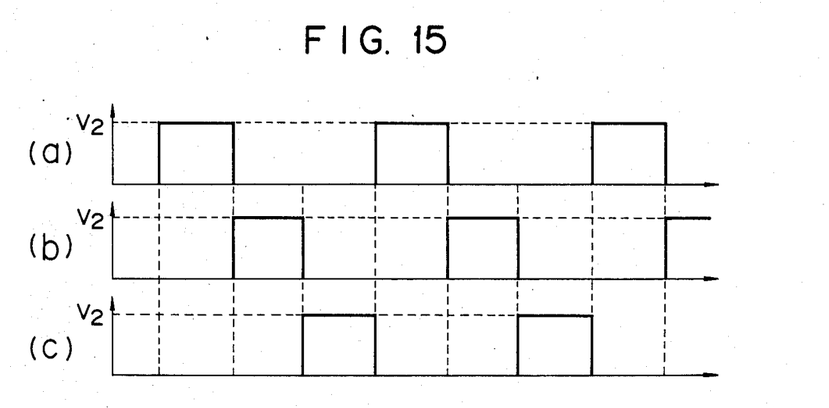
Figure 16:
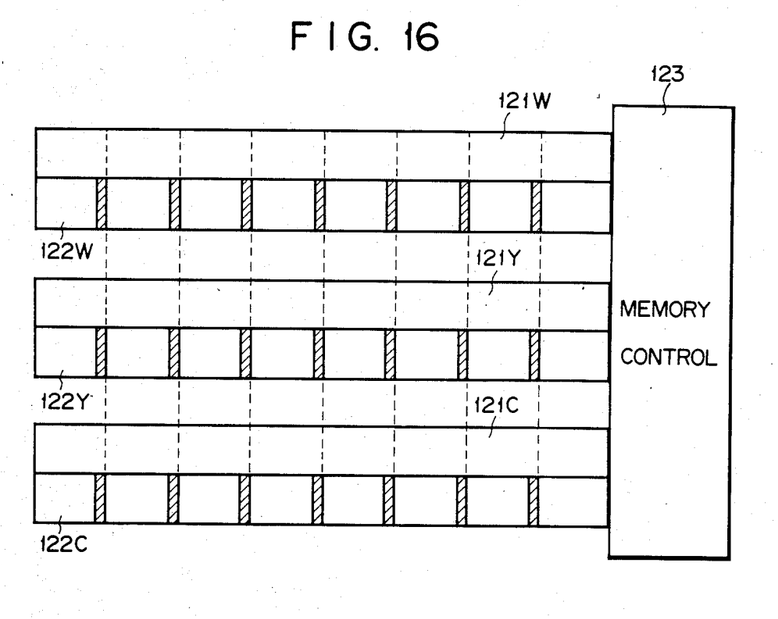
FIG. 16 is a schematic diagram of storage locations in memory.

These amplified signals are supplied to multiplexers 541, which act as switches. Multiplexers 541 operate with a period which is twice the period of the pulse signals from the CCD scanning pulse generator. Accordingly, multiplexers 541 select signals corresponding to the pairs of white, yellow and cyan filters at the timing shown in FIG. 15, and output a time-division-multiplexed signal.

This time-division-multiplexed signal is supplied to A/D converters 542. One A/D converter 542 is time-shared among three amplifiers, for example, 531a, 531b and 531c. Since A/D converters are very expensive, it is best to use the minimum number.

The digital output of the A/D converters is supplied to memory 55, where it is stored. As mentioned above, line memory 55 is segmented into memories according to the color of the information. Moreover, in this memory 55, gates are provided corresponding to the switching action of multiplexers 541a–541h. That is, the digital output signals of A/D converters 541a–542h are stored in line memories 121W, 121Y and 121C by memory control 123, which operates the gates for each color.

It is not necessary to store in each line memory the same number of digital signals as there are CCD cells (16,384 separate signals). First, as mentioned above, filters of same color are attached in pairs to the cells; consequently, the number of signals required to be stored is reduced by half. Second, since the signals are separated as to color, the number of signals stored in each memory segment 121W, 121Y or 121C, is reduced again by ⅓. As a result, it is sufficient that the line memory for each color 121W, 121Y or 121C has the capacity to store 1/6 as many signals as there are CCD cells.

When it is desired to read out the stored information, the signals stored in line memories 121W, 121Y and 121C for each color are supplied to the line memories 122W, 122Y and 122C in parallel. As shown in FIG. 1, adjacent CCD chips 11a–11h are overlapped optically for a distance of about 170 CCD cells. Accordingly, during output from memory 55, it is necessary to remove the overlapped (redundant) signals.

Figure 17:
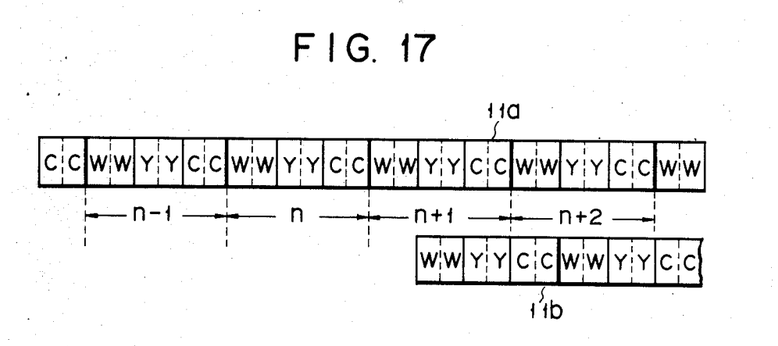
FIG. 17 is a diagrammatic view for use in explaining the optical overlap of CCD cells.

For example, as shown in FIG. 17, the picture elements from the left end to the number n of first CCD array, on chip 11a, are not overlapped with the second CCD array, on chip 11b, whereas the picture elements from the number (n+1) to the right end of first chip 11a are optically overlapped with second chip 11b. In each line memory 121W, 121Y, 121C, 122W, 122Y, or 122C, one electrical signal is stored for each picture element; consequently, it is necessary to remove the redundant electrical signals corresponding to the elements from the number (n+1) to the right end. Removal is accomplished by skipping these signals when they are being read out. This skipping is performed separately for each line memory by the memory control.

The method of removing the redundant information will now be explained by reference to FIGS. 18 and 19. After construction of the solid state image sensor, it must be tested by exposing it to, and reading, a test pattern consisting of a white background on which are printed a number of parallel black lines. The width of each line is equal to one picture element, i.e., six CCD cells in the preferred embodiment. Such an arrangement is illustrated schematically in FIG. 18; shown there are portions of two overlapped photosensor arrays on chips 11a and 11b and three black lines La, Lb and Lc of the test pattern. The portion of array 11a which is overlapped with array 11b, and which therefore reads redundant information, is labelled X. The spacing between the black lines is greater than the width of portion X and may be, for example 20 mm.

Figure 18:
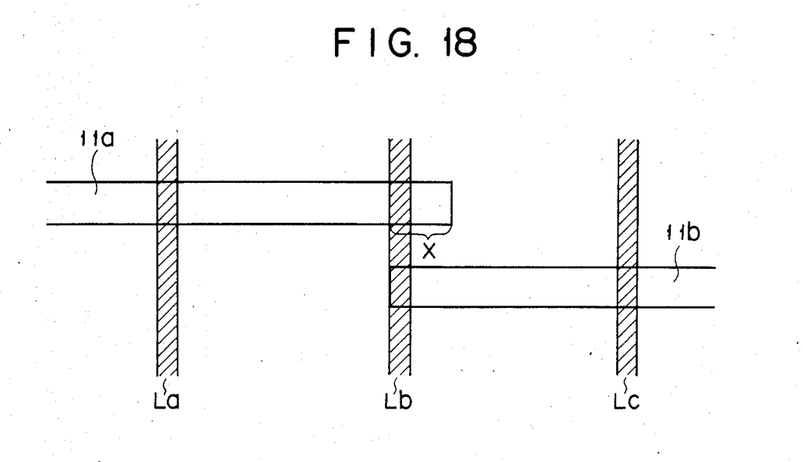

During the final adjustment of each solid state image sensor, it is exposed to the test pattern, as shown in FIG. 18. The test pattern is aligned so that one of the parallel black lines, for example, line Lb, is positioned exactly at the end of the particular photosensor array, for example, 11b, which overlaps the array containing portion X. The test pattern's black line Lb covers the first six CCD cells in array 11b. The test pattern is then read into the three color line memories 121W, 121Y, and 121C. The redundant information produced by portion X is read into each memory along with all other information produced by arrays 11a and 11b.

Figure 19A:
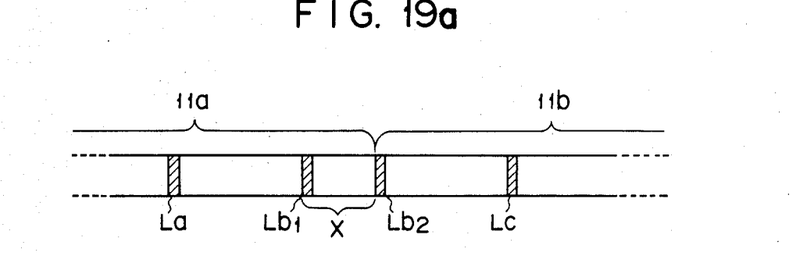

The signals stored in each line memory are schematically represented in FIG. 19(a). Signal La is the stored signal corresponding to line La of the test pattern. Signal Lb$_1$ is the stored signal corresponding to line Lb as detected by array 11a, while signal Lb$_2$ is the stored signal corresponding to line Lb as detected by array 11b. Similarly, signal Lc is the stored signal corresponding to line Lc as detected by array 11b. Stored signals indicated by X in FIG. 19(a) are redundant, since they correspond to the area of the test pattern read by portion X of array 11a.

Figure 19B:
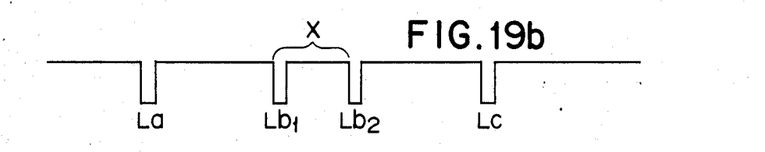
Figure 19C:
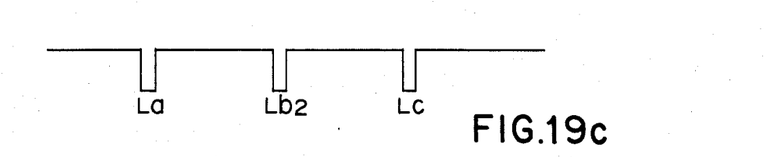

The digital signals stored in each line memory are then transferred, in parallel, to line memories 122W, 122Y and 122 C, respectively, read out by memory control 123, and converted into analog form, as shown in FIG. 19(b). The interval X in FIG. 19(b) represents the redundant information which must be removed. In order to remove the redundant signals, successive address locations in each memory 122W, 122Y, and 122C are skipped by memory control 123 upon readout of the information, beginning with the address of the last picture element sensed by array 11a. As addresses of successive picture elements are skipped, the interval between pulse $Lb_1$ and $Lb_2$ in the output waveform, shown in FIG. 19(b), is diminished. When pulses $Lb_1$ and $Lb_2$ merge into a single Lb pulse, as in FIG. 19(c), memory control 123 ceases skipping address locations upon readout, and the redundant information has been eliminated. This operation is repeated for each area of overlap of the arrays and for each line memory 122W, 122Y and 122C.

Physically, on ceramic base 12 is located only the input section 51. Integrating section 52, amplifying section 53, A-D converting section 54 and memory 55 are positioned not on the base 12 of the sensor, but remote from it and electrically connected to it by a cable. The advantages of such a construction are light weight and noise reduction. Because only chips 11a-11h, sampling and holding circuits 56a-56h, differential amplifiers 57a-57h, light source 31 and self-focusing rod-lens-arrays 21a, 21b are in the optical head, very little mass must be moved to scan the document. Noise is substantially cancelled in integrating section 52, which is downstream of the cable where noise will most likely be introduced.

Errors are also reduced by attaching a filter of the same color to two adjacent CCD cells. If one CCD cell is defective, the signal from the other cell can be used to achieve almost the same image quality as if both cells were operating. Two cells provide redundancy which may be dispensed with if one is bad. Indeed, when 2048 CCD cells are formed in a single chip, sometimes two or three cells are defective. If cells are not used in pairs for detection, chips having defective elements must be abandoned as inferior goods. But when these chips are used as in this embodiment, they are substantially equivalent to those having no defective cells. This is even more effective in the case of reading out a black-and-white document. Where six CCD cells are used to discern a single picture element in black-and-white image sensing, up to five cells can be inoperative without loss of the image information. During testing of the sensor, the inoperative cells will be detected. These can be automatically ignored by the device when the image is read out from memory. Furthermore, if there are actually no defective elements, using the signals from several adjacent CCD cells increases the signal-to-noise (S/N) ratio. Another advantage to using the cells in pairs is that errors in positioning the colored filters on the cells are more tolerable. One color picture element can, however, be read out by 3, rather than 6, CCD cells. In this case, filters of white, yellow and cyan are attached individually to CCD cells. Moreover, in the case of reading out a black-and-white document, one picture element can be detected by a single CCD cell.

The merits of this embodiment of the invention are as follows:

(1) It is highly noise-resistant.
(2) The number of A/D converters can be minimized.
(3) Adjustment of the circuit is possible for each color separately.
(4) The weight of elements on the moving base is minimized so that the optical head may be easily moved.

Merits (1) and (4) are mutually related. Only optical head 51, which extracts signals corresponding to the three colors and amplifies them, is disposed on the base. Accordingly, the weight of the base is light. Furthermore, signals developed by the optical head are sent to integrating section 52 by cable. Even if noise is added at the cable, it is cancelled by integrating section 52. After the noise is cancelled, the signals are amplified by amplifying section 53, so the effect of noise does not appear.

Merit (2) is due to using the time division technique.
Merit (3) is due to amplifying each color separately.

Moreover, in this embodiment signals are transmitted by CCD's, which have a high transmitting speed. And, in the case, for example, of reading an A4-size document, the transmitting time is shorter in using 8 CCDs to cover the line than in using one, because signals must be shifted only a maximum of 2,049 times during output (once into the output register, in parallel, and 2,048 times serially out of the register). The extra signals from CCD cells which overlap can be removed during readout from line memories 122W, 122Y and 122C, making readout time in this embodiment equal to that of the case where one large CCD chip is used.

Although illustrative embodiments of the invention have been described in detail with reference to the accompanying drawings, it is to be understood that the invention is not limited to those precise embodiments and that various changes and modifications may be effected therein by one skilled in the art without departing from the scope or spirit of the invention. In the preferred embodiment, photosensitive element arrays and their associated output registers are integrated circuits made of CCDs. However, they may be made of other CTDs (charge transfer devices), for example, BBD (bucket brigade device), CID (charge injection device), LCD (light coupled device), PCD (plasma coupled device) or Scanister. Charge-coupled devices are preferred, however, because they combine two functions—they store charges created by the light to which they are exposed, and they transfer charges to output devices. For the other types of CTD's, separate semiconductor switches must be integrated between the individual photosensitive elements and the corresponding elements of the output register, making the circuitry somewhat more complex.

In regard to the arrangement of photosensitive element arrays, instead of two lines, three lines or more covering the read out area may be used. The optical system is not restricted to self-focusing rod-lens-arrays; and the number of lights is not restricted to one. The light source, moreover, may be a fluorescent lamp or a string of LEDs (Light Emitting Diodes). Obviously, many modifications and variations of this invention are possible in light of the above teachings.

I claim:

1. A high resolution solid state image sensor for converting a line of picture elements from a document into electrical signals representive of the picture elements, said solid state image sensor comprising:

a source of light to illuminate the line;
a plurality of rows of CCD arrays, the combined length of said arrays being greater than the width of the document, each of said arrays having a length less than the width of the document and including a plurality of photosensors to convert incident light to electrical signals, said arrays of each row being staggered relative to said arrays of adjacent rows so that end portions of said arrays in different rows overlap to produce redundant electrical signals;
an optical system between said line and each of said rows to transmit reflected light from the line to said arrays, said optical system projecting onto said arrays an unreversed and unmagnified light image of the line of picture elements; and transport means connected to said arrays for transporting the electrical signals to an output terminal; said arrays being arranged among said rows in such a manner that an image of each picture element is formed on at least one array, and the image of each picture element is projected onto at least two adjacent photosensors in the same array.

2. The solid state image sensor of claim 1 wherein said transport means comprises an integrated output register connected to each of said arrays to receive therefrom a parallel transfer of the electrical signals.

3. The solid state image sensor of claim 2 wherein each of said arrays is formed on a separate semiconductor chip along with said connected output register.

4. The solid state image sensor of claim 1 wherein said optical systems comprise self-focusing rod-lens-arrays.

5. The solid state image sensor of claim 4 wherein said optical system projects onto said arrays an erect, real image.

6. A high resolution solid state image sensor for converting a line of picture elements from a document into electrical signals representative of the picture elements, said solid state image sensor comprising:
a source of light to illuminate the line;
a plurality of rows of CCD arrays, the combined length of said arrays being greater than the width of the document, each of said arrays having a length less than the width of the document and including a plurality of photosensors to convert incident light to electrical signals, said arrays of each row being staggered relative to said arrays of adjacent rows so that end portions of said arrays in different rows overlap to produce redundant electrical signals;
an optical system between said line and each of said rows to transmit reflected light from the line to said arrays, said optical system projecting onto said arrays an unreversed and unmagnified light image of the line of picture elements, the image of each picture element being projected onto at least two adjacent photosensors in the same array;
transport means connected to said arrays for transporting the electrical signals to an output terminal;
signal processing means connected to said output terminal for processing the electrical signals; and
memory means connected to said signal processing means for storing the processed electrical signals, said memory means including memory control means for reading out the processed electrical signals except for the redundant electrical signals.

7. The solid state image sensor of claim 6 wherein the redundant electrical signals are produced at one of said ends of each array except the last of said arrays.

8. The solid state image sensor of claim 6 wherein said transport means comprises an integrated output register connected to each of said arrays to receive therefrom a parallel transfer of the electrical signals.

9. The solid state image sensor of claim 8 wherein each of said arrays is formed on a separate semiconductor chip along with said connected output register.

10. The solid state image sensor of claim 6 wherein said optical systems comprise self-focusing rod-lens-arrays.

11. The solid state image sensor of claim 10 wherein said optical system projects onto said arrays an erect, real image.

12. The solid state image sensor of claim 6 wherein said signal processing means produces the processed electrical signals, each of the processed electrical signals corresponding to the image of each picture element.

13. A high resolution solid state image sensor for converting a line of picture elements from a document into electrical signals representative of the picture elements, said solid state image sensor comprising:
a source of light to illuminate the line;
a plurality of rows of CCD arrays, the combined length of said arrays being greater than the width of the document, each of said arrays having a length less than the width of the document and including a plurality of photosensors to convert incident light to electrical signals, said arrays of each row being staggered relative to said arrays of adjacent rows so that end portions of said arrays in different rows overlap to produce redundant electrical signals;
color filter means including a plurality of groups of color filters, each of said groups having at least three color filters arranged serially in the same CCD, each color filter of the same group corresponding to at least one of said adjacent photosensors;
an optical system between said line and each of said rows to transmit reflected light from the line to said arrays through said color filter means, said optical system projecting onto said arrays an unreversed and unmagnified light image of the line of picture elements; and
transport means connected to said arrays for transporting the electrical signals to an output terminal;
said arrays being arranged among said rows in such a manner that an image of each picture element is formed on at least one array, and the image of each picture element is projected onto at least three adjacent photosensors in the same array through said group of color filters.

14. The solid state image sensor of claim 13 wherein said transport means comprises an integrated output register connected to each of said arrays to receive therefrom a parallel transfer of the electrical signals.

15. The solid state image sensor of claim 14 wherein each of said arrays i formed on a separate semiconductor chip along with said connected output register.

16. The solid state image sensor of claim 13 wherein said optical system compriese self-focusing rod-lens-arrays.

17. The solid state image sensor of claim 16 wherein said optical system projects onto said arrays an erect, real image.

18. The solid state image sensor of claim 13 wherein each color filter of the same group corresponds to at least two of said consecutive photosensors and the image of each picture element is projected onto at least six consecutive photosensors in the same array through said group of color filters.

19. A high resolution solid state image sensor for converting a line of picture elements from a document into electrical signals representative of the picture elements, said solid state image sensor comprising:
a source of light to illuminate the line;
a plurality of rows of CCD arrays, the combined length of said arrays being greater than the width of the document, each of said arrays having a length less than the width of the document and including a plurality of photosensors to convert incident light to electrical signals, said arrays of each row being staggered relative to said arrays of adjacent rows so that end portions of said arrays in different rows overlap to produce redundant electrical signals;

color filter means including a plurality of groups of at least three kinds of color filters, each color filter of the same group corresponding to at least one of said adjacent photosensors;

an optical system between said line and each of said rows to transmit reflected light from the line to said arrays through said color filter means, said optical system projecting onto said arrays an unreversed and unmagnified light image of the line of picture element, the image of each picture element being projected onto at least three adjacent photosensors in the same array;

transport means connected to said arrays for transporting the electrical signals to an output terminal;

signal processing means connected to said output terminal for processing the electrical signals; and memory means connected to said signal processing means for storing the processed electrical signals, said memory means including memory control means for reading out the processed electrical signals except for the redundant electrical signals.

20. The solid state image sensor of claim 19 wherein the redundant electrical signals are produced at one of said ends of each array except the last of said arrays.

21. The solid state image sensor of claim 19 wherein said transport means comprises an integrated output register connected to each of said arrays to receive therefrom a parallel transfer of electrical signals.

22. The solid state image sensor of claim 21 wherein each of said arrays is formed on a separate semiconductor chip along with said output register.

23. The solid state image sensor of claim 19 wherein said optical system comprise self-focusing rod-lens-arrays.

24. The solid state image sensor of claim 23 wherein said optical system projects onto said arrays an erect, real image.

25. The solid state image sensor of claim 19 wherein each of said color filters of the same group corresponds to at least two of said consecutive photosensors and the image of each picture element is projected onto at least six consecutive photosensors in the same array through said group of color filters.

26. The solid state image sensor of claim 19 wherein said signal processing means produced the processed electrical signals, each of the processed electrical signals corresponding to a color image of each picture element.

* * * * *